(12) United States Patent
Tsuchiya et al.

(10) Patent No.: US 7,993,009 B2
(45) Date of Patent: Aug. 9, 2011

(54) PROJECTOR

(75) Inventors: Masaki Tsuchiya, Gunma (JP);
Naoyuki Uchiyama, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 271 days.

(21) Appl. No.: 12/513,103

(22) PCT Filed: Oct. 23, 2007

(86) PCT No.: PCT/JP2007/070607
§ 371 (c)(1),
(2), (4) Date: Apr. 30, 2009

(87) PCT Pub. No.: WO2008/053744
PCT Pub. Date: May 8, 2008

(65) Prior Publication Data
US 2010/0066980 A1    Mar. 18, 2010

(30) Foreign Application Priority Data
Oct. 31, 2006   (JP) ................................. 2006-296305

(51) Int. Cl.
*G03B 21/16*     (2006.01)
(52) U.S. Cl. ........ 353/54; 353/61; 165/104.11; 361/698
(58) Field of Classification Search .............. 353/52–61; 165/104, 104.11; 361/688, 691, 689, 690
See application file for complete search history.

(56) References Cited

U.S. PATENT DOCUMENTS

| | | | |
|---|---|---|---|
| 4,739,396 A | 4/1988 | Hyatt | |
| 6,290,360 B1 | 9/2001 | Konuma et al. | |
| 6,997,006 B2 * | 2/2006 | Kameyama et al. | 62/259.2 |
| 7,444,827 B2 * | 11/2008 | Lee et al. | 62/259.2 |
| 2006/0279706 A1 * | 12/2006 | Bash et al. | 353/54 |

FOREIGN PATENT DOCUMENTS

| | | |
|---|---|---|
| JP | 2000-267190 | 9/2000 |
| JP | 2000-321668 | 11/2000 |
| JP | 2004-317956 | 11/2004 |
| JP | 2005-121250 | 5/2005 |
| JP | 2005-321525 | 11/2005 |
| JP | 2006-208488 | 8/2006 |

OTHER PUBLICATIONS

Japanese Office Action issued in Japanese Patent Application No. JP 2006-296305 dated Nov. 2, 2010.

European Search Report issued in European Patent Application No. 07830341.9-2209, mailed Oct. 1, 2010.

* cited by examiner

*Primary Examiner* — William C Dowling
(74) *Attorney, Agent, or Firm* — McDermott Will & Emery LLP

(57) ABSTRACT

There is disclosed a projector capable of efficiently cooling an optical element while decreasing the generation of noise as much as possible. A projector P includes a main body 1 provided with a light source 2, an optical element 4 (liquid crystal panels 5, 6 and 7, polarization plates 8A, 8B and a prism 25) which processes (modulates) light emitted from this light source 2 in accordance with image information and a projection lens 9 which projects a modulated projection optical image onto a screen, and further includes a cooling apparatus 10 in which a compressor 12, a radiator 14, a capillary tube 16 (a pressure reducing unit) and an evaporator 18 provided in the main body 1 constitute a refrigerant circuit, and air subjected to heat exchange between the air and the evaporator 18 is supplied to the liquid crystal panels 5, 6 and 7 to cool the panels.

6 Claims, 6 Drawing Sheets

PROJECTOR

BACKGROUND OF THE INVENTION

The present invention relates to a projector which processes light emitted from a light source by an optical element to project a processed projection optical image onto a screen by a projection lens.

Heretofore, this type of projector, for example, a liquid crystal projector has a constitution in which a light source, a liquid crystal panel (an optical element), a projection lens and the like are mounted in a main body. The liquid crystal panel is constituted of three liquid crystal panels for processing (modulating) color rays in accordance with image information generally as light bulbs. Moreover, light emitted from the light source is split into the color rays, processed (modulated) by the liquid crystal panels in accordance with the image information and synthesized as a projection optical image through a prism and the like. Then, the synthesized projection optical image is enlarged and projected onto a screen by the projection lens.

In such a projector, the light source and the optical element (the liquid crystal panels, etc.) are heat generation sources to bring the inside of the main body into a heated state. Therefore, a plurality of fans are installed in the main body, and supply (blow) air outside the projector (the outside air) to the optical element and the light source to release the heat. In this case, the light source has a very high temperature of about +900° C., and the heat can sufficiently be released by the outside air, but the upper limit of the use temperature of the optical element is a comparatively low temperature. When, for example, the liquid crystal panels are used as the optical elements, the upper limit of the use temperature is about +70° C. to +80° C. Therefore, the amount of the heat to be released from the optical elements is noticeably influenced by an outside air temperature. That is, when the outside air temperature is low, the optical elements can sufficiently release the heat to the supplied outside air. However, when the outside air temperature is high, the amount of the air to be blown by the fans needs to be increased to secure the amount of the heat to be released. Therefore, noise due to the operation of the fans increases, and a problem also occurs that power consumption remarkably soars.

Moreover, the outside air receiving the heat is released to the outside, but this released outside air is again sucked by the fans and supplied to the projector. There also occurs a problem that a so-called short cycle of the air after the heat release is generated, and any excellent heat release effect cannot be obtained.

To solve such a problem, it has been suggested that low-temperature air be produced by thermoelectric cooling, to cool the liquid crystal panels (the optical elements) (e.g., see Japanese Patent Application Laid-Open No. 2005-121250).

The problem of the noise can be solved by such thermoelectric cooling, but such thermoelectric cooling has a poor energy efficiency, and a heat generating section for the thermoelectric cooling is integrally constituted. Therefore, means for releasing the heat to the outside air (a heat sink or the fans) is required near a cooling target, and a problem has occurred that a spatial restriction is generated to remarkably lower a degree of freedom in design.

SUMMARY OF THE INVENTION

The present invention has been developed to solve a conventional technical problem, and an object thereof is to provide a projector capable of efficiently cooling an optical element while decreasing the generation of noise as much as possible.

The projector of the present invention comprises a main body provided with a light source, an optical element which processes light emitted from this light source in accordance with image information and a projection lens which projects a processed projection optical image onto a screen, and further comprises a cooling apparatus in which a compressor, a radiator, a pressure reducing unit and an evaporator provided in the main body constitute a refrigerant circuit, characterized in that air subjected to heat exchange between the air and the evaporator is supplied to the optical element to cool the optical element.

The projector of a second aspect of the invention is characterized in that in the invention of a first aspect, the inside of the main body is partitioned into a first zone in which the light source is provided and a second zone in which the optical element is provided and which is sealed, and the air subjected to the heat exchange between the air and the evaporator is circulated through this second zone.

The projector of a third aspect of the invention is characterized in that in the invention of the first aspect or the second aspect, the inside of the main body is partitioned into the first zone and the second zone by a partition member, and this partition member is made of an insulating material.

The projector of a fourth aspect of the invention is characterized in that in the invention of the third aspect, the partition member is constituted of a plurality of plate members, and detachably provided in the main body.

The projector of a fifth aspect of the invention is characterized in that in the invention of the first aspect, cold air subjected to the heat exchange between the air and the evaporator is supplied to the optical element through a duct.

The projector of a sixth aspect of the invention is characterized in that in the invention of the fifth aspect, the evaporator constitutes a part of the duct or is provided in this duct, and the duct is made of an insulating material, and constituted so that the cold air subjected to the heat exchange between the air and the evaporator is circulated through the duct.

The projector of a seventh aspect of the invention is characterized in that in the invention of the fifth aspect or the sixth aspect, the duct is constituted of a plurality of members detachably provided in the main body.

The projector of an eighth aspect of the invention is characterized in that in the invention according to any one of the first to seventh aspects, the optical element includes a liquid crystal panel, polarization plates provided on the incidence side and the emission side of this liquid crystal panel, and a prism.

According to the present invention, the projector comprises the main body provided with the light source, the optical element which processes the light emitted from this light source in accordance with the image information and the projection lens which projects the processed projection optical image onto the screen, and the projector further comprises the cooling apparatus in which the compressor, the radiator, the pressure reducing unit and the evaporator provided in the main body constitute the refrigerant circuit, and the air subjected to the heat exchange between the air and the evaporator is supplied to the optical element to cool the optical element. Therefore, the optical element can be cooled without being influenced by an outside air temperature. In consequence, the optical element can always be kept at a constant temperature.

Moreover, the cold air subjected to the heat exchange between the air and the evaporator can constantly be supplied to the optical element. Therefore, a fan can be miniaturized, the amount of air to be blown by the fan can be decreased, and hence the reduction of an installation space and the decrease of noise can be achieved. Furthermore, an energy efficiency can be improved.

Furthermore, when heat exchange is performed between the air heated by heat generated by the optical element and a refrigerant flowing through the evaporator of the cooling apparatus, the heat of the optical element can be conveyed by the refrigerant. Therefore, unlike a case where the optical element is cooled by cooling electrons, a degree of freedom in spatial layout design improves.

Additionally, as in the second aspect of the invention, the inside of the main body is partitioned into the first zone in which the light source is provided and the second zone in which the optical element is provided and which is sealed, and the air subjected to the heat exchange between the air and the evaporator is circulated through this second zone. In this case, the optical element can be separated from the light source having a higher temperature, and it is possible to eliminate a disadvantage that the optical element is influenced by the heat from the light source. In consequence, a further cooling effect can be secured. Furthermore, any outside air does not enter the second zone, and the second zone constitutes a sealed space through which the air is circulated. Therefore, the whole second zone can homogeneously be cooled. Moreover, any dust or mote does not enter the zone from the outside air, and hence any filter is not necessary, so that the improvement of the quality of the optical element and the decrease of cost can be achieved.

Moreover, as in the third aspect of the invention, the inside of the main body is partitioned into the first zone and the second zone by the partition member, and this partition member is made of the insulating material, whereby it is possible to eliminate a disadvantage that the optical element in the second zone is influenced by the heat from the light source in the second zone.

Furthermore, as in the fourth aspect of the invention, the partition member is constituted of the plurality of plate members, and detachably provided in the main body, whereby an assembling operation during production, a removal operation during repair or the like, or an assembling operation after the repair can easily be performed.

Additionally, in the first aspect of the invention, as in the fifth aspect of the invention, the cold air subjected to the heat exchange between the air and the evaporator is supplied to the optical element through the duct, whereby the cold air subjected to the heat exchange between the air and the evaporator can efficiently be supplied to the optical element, and the heat release effect of the optical element can be promoted.

Moreover, as in the sixth aspect of the invention, the evaporator constitutes a part of the duct or is provided in the duct, and the duct is made of the insulating material, and constituted so that the cold air subjected to the heat exchange between the air and the evaporator can be circulated through the duct. In consequence, the cold air subjected to the heat exchange between the air and the evaporator can more effectively be supplied to the optical element, and the heat release effect of the optical element can further be promoted.

Furthermore, as in the seventh aspect of the invention, the duct is constituted of the plurality of members detachably provided in the main body, whereby the assembling operation during the production, the removal operation during the repair or the like or the assembling operation after the repair can easily be performed. In particular, the removal or assembling of each device provided in the duct can easily be performed, and operability can remarkably be improved.

In particular, as in the eighth aspect of the invention, the optical element includes the liquid crystal panel, the polarization plates provided on the incidence side and the emission side of this liquid crystal panel, and the prism, so that according to the first to seventh aspects of the invention, while decreasing the generation of the noise of the projector including the liquid crystal panel, the polarization plates and the prism as much as possible, the liquid crystal panel, the polarization plates and the prism can efficiently be cooled.

DETAILED DESCRIPTION OF THE PREFERRED EMBODIMENT

The present invention relates to a projector, and an object thereof is to efficiently cool an optical element while solving a problem of noise generated in a case where outside air is supplied to the optical element by a fan to release heat, and a problem of an energy efficiency due to the cooling of the optical element by thermoelectric cooling. The object of efficiently cooling the optical element while decreasing the generation of the noise as much an possible is realized by disposing a cooling apparatus in which a compressor, a radiator, a pressure reducing unit and an evaporator provided in a main body constitute a refrigerant circuit and supplying air subjected to heat exchange between the air and the evaporator to the optical element to cool the optical element. Hereinafter, embodiments of the present invention will be described in detail with reference to the drawings.

Embodiment 1

Figure 1:
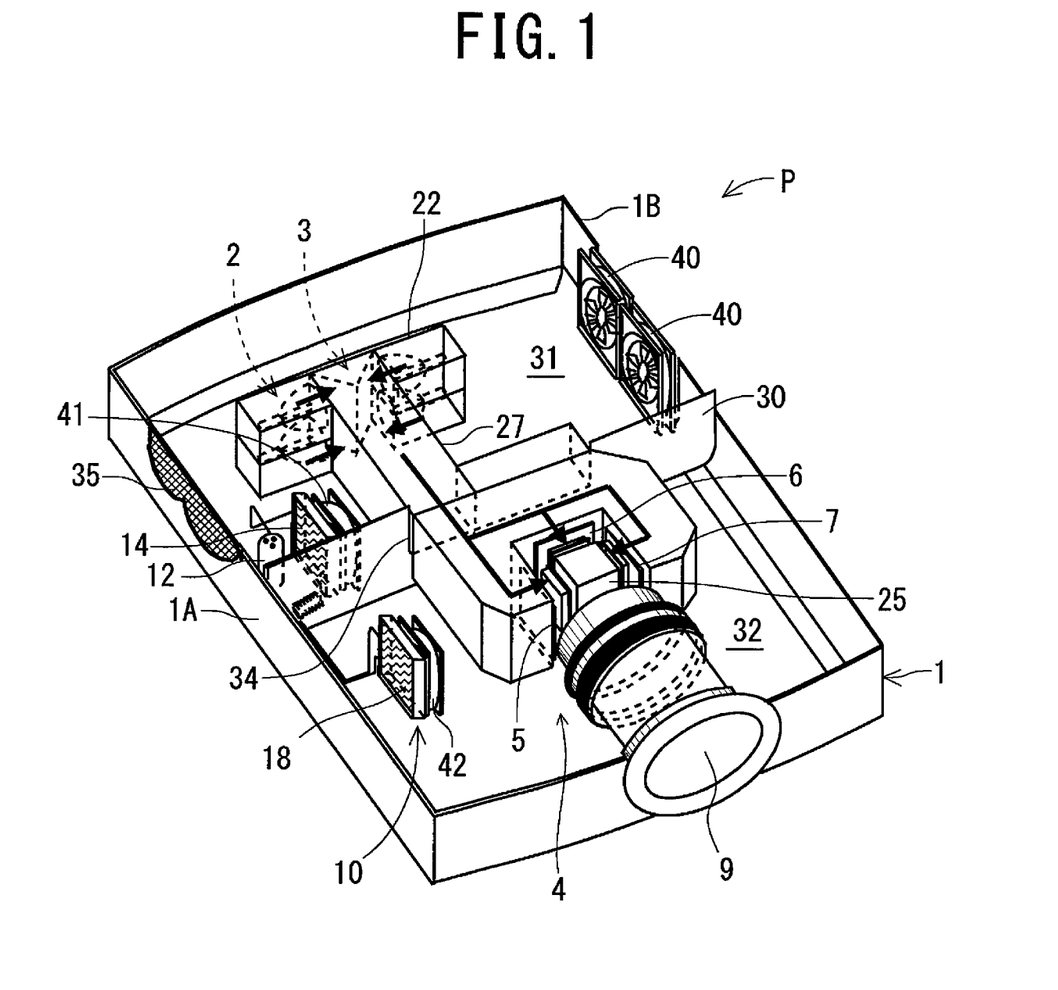
FIG. 1 is a perspective view showing the outline of a liquid crystal projector of one embodiment of the present invention.
Figure 2:
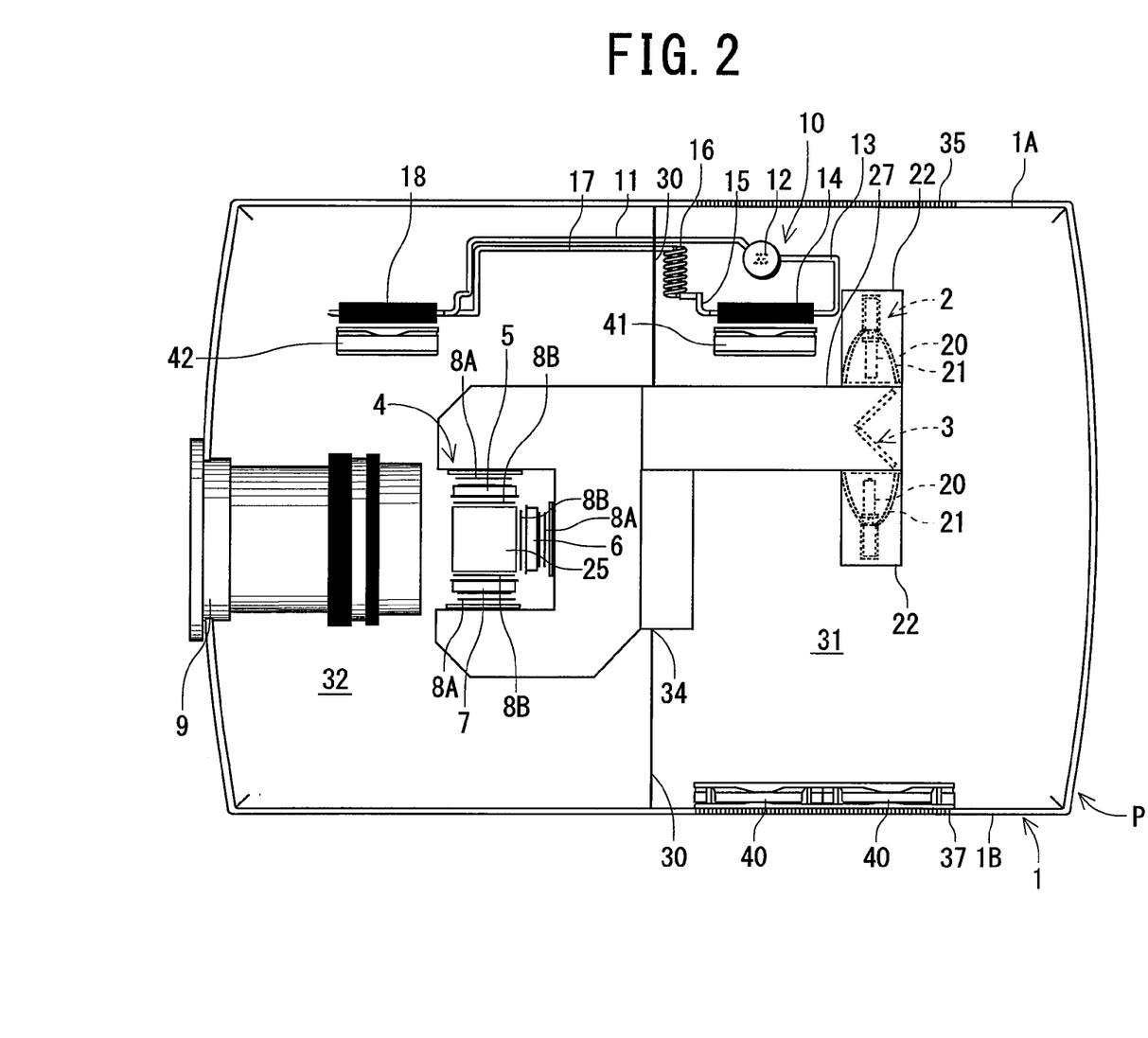
FIG. 2 is a plan view showing the outline of the liquid crystal projector of the embodiment of the present invention.

FIG. 1 is a schematic perspective view showing a projector of one embodiment of the present invention, and FIG. 2 is a plan view of FIG. 1. The projector of the embodiment is a liquid crystal projector P having a main body 1 provided with a light source 2, a homogeneous illumination optical system 3, a color splitting optical system (not shown), an optical element 4, a projection lens 9 and a cooling apparatus 10 for the optical element 4. The main body 1 is a flat housing made of a material excellent in heat release properties, for example, magnesium. It is to be noted that in FIGS. 1 and 2, for the description of each device provided in the main body 1, the main body 1 is shown by a flat section of a cut upper part.

The light source 2 includes a lamp 20 such as an extra high pressure mercury lamp, and a reflector 21 for emitting forwards light (diverging light) diverging from the lamp (FIG. 2). The light source 2 of the embodiment has a constitution in which the reflectors 21 are attached to a plurality of (four) lamps 20, respectively, and the light source is received in a lamp box 22 provided in the main body 1.

The homogeneous illumination optical system 3 forms the light emitted from the light source 2 into a parallel luminous flux having a homogeneous luminance distribution, and includes an integrator lens, a condensing lens, a total reflection mirror and the like. Moreover, the color splitting optical system splits the parallel luminous flux from the homogeneous illumination optical system 3 into color rays of colors R, G and B, and includes a reflecting mirror for splitting the parallel luminous flux from the homogeneous illumination optical system 3 into the colors, a prism for guiding the split color luminous fluxes to the optical element 4 and the like.

The optical element 4 includes three liquid crystal panels (LCD panels) 5, 6 and 7, polarization plates 8A provided on the incidence sides of the liquid crystal panels 5, 6 and 7 with spaces being left between the plates and the panels, polarization plates 8B provided on the emission sides of the liquid crystal panels 5, 6 and 7 with spaces being left between the plates and the panels, a prism 25 and the like. The liquid crystal panels 5, 6 and 7 process (modulate) the light split by the color splitting optical system and guided to the liquid crystal panels 5, 6 and 7 in accordance with image information. Moreover, the prism 25 synthesizes the respective color rays to form a projection optical image. This prism 25 includes a reflective face constituted of an X-like dielectric multilayered film, and the light from the liquid crystal panels 5, 6 and 7 is formed into a single luminous flux through the reflective face. It is to be noted that the projection lens 9 enlarges and projects the projection optical image from the prism 25 onto a screen, and is detachably arranged in a hole (not shown) formed in a wall face of the main body 1. It is to be noted that in FIGS. 1 and 2, reference numeral 27 is a box member which covers a light path for guiding the light emitted from the light source 2 to the liquid crystal panels 5, 6 and 7, the polarization plates 8A, 8B and the like. That is, in the box member 27, the path (the light path) is formed through which the light passes from the light source 2 to the polarization plates 8A on the incidence sides of the liquid crystal panels 5, 6 and 7.

An operation of the above constitution will be described. As shown by arrows in FIG. 1, the light emitted from the light source 2 is formed into a parallel luminous flux having a homogeneous luminance distribution through the homogeneous illumination optical system 3, split into the rays of the colors R, G and B in the color splitting optical system, and guided through the incidence-side polarization plates 8A to the corresponding liquid crystal panels 5, 6 and 7 which function as light bulbs, respectively. The luminous fluxes guided to the liquid crystal panels 5, 6 and 7 are modulated in accordance with the image information in the panels, formed into a single luminous flux projection image by the prism 25 through the emission-side polarization plates 8B, and then enlarged and projected onto the screen by the projection lens 9.

Meanwhile, heretofore in the liquid crystal projector, the light source and the liquid crystal panels are heat generation sources to bring the inside of the main body into a heated state, and hence a plurality of fans are installed in the main body so that the air outside the main body is supplied to the liquid crystal panels and the light source by the fans, thereby releasing the heat. Specifically, one example will be described. After supplying the outside air to the liquid crystal panels to release the heat, the air passed through the liquid crystal panels is supplied to the light source to release the heat from the light source. Afterward, the air heated by the light source is discharged from the main body by the fans.

The above light source has a considerably high temperature of about +900° C., and hence the air passed through the liquid crystal panels can be supplied to sufficiently release the heat. On the other hand, the upper limit of the use temperature of each liquid crystal panel is a comparatively low temperature of about +70° C. to +80° C., and the liquid crystal panels need to be cooled to the upper limit temperature or less. In consequence, the amount of the heat to be released from the liquid crystal panels is noticeably influenced by an outside air temperature. That is, when the outside air temperature is low, the outside air supplied to the liquid crystal panels is low, and hence the heat can sufficiently be released by the outside air. However, in a case where the outside air temperature is high, when a large amount of outside air is not supplied to the liquid crystal panels by increasing the amount of the air to be blown by the fans or the like, the temperature of the liquid crystal panels cannot be kept at the upper limit of the use temperature or less. In consequence, the noise increases owing to the operation of the fans, and a problem also occurs that power consumption due to the operation of the fans remarkably soars.

Furthermore, the outside air receiving the heat in the main body is discharged to the outside, but the discharged outside air is again sucked by the fans. There has been a problem that a so-called short cycle of the air after the heat release is generated. In this case, the outside air sucked by the fans performs heat exchange between the air and the light source, and is heated to the high temperature. Therefore, when such a short cycle is generated, the temperature of the liquid crystal panels might rise, and an excellent heat release effect cannot be obtained.

On the other hand, it has been suggested that low-temperature air be produced by thermoelectric cooling, thereby cooling the liquid crystal panels, but such thermoelectric cooling has a poor energy efficiency, and a heat generating section for the thermoelectric cooling is integrally constituted. Therefore, means for releasing the heat to the outside air (a heat sink or the fans) is required near a cooling target, and a problem has occurred that a spatial restriction is generated to remarkably lower a degree of freedom in design.

Figure 3:
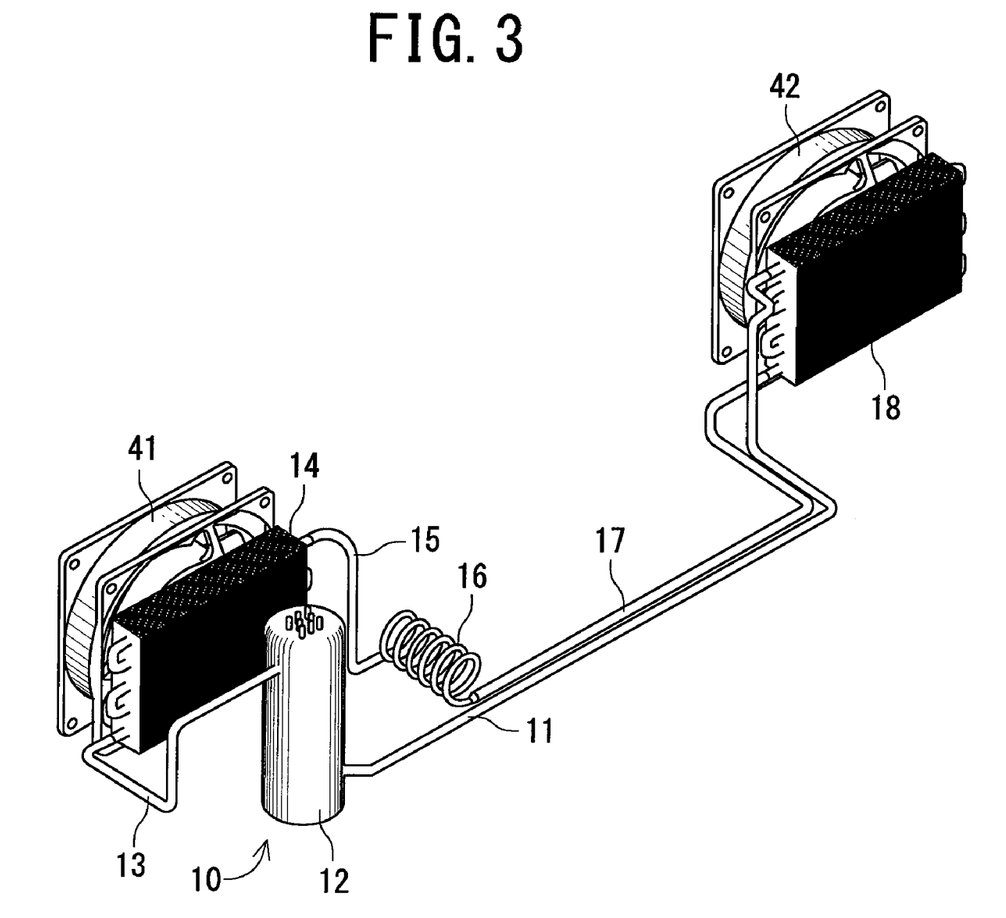
FIG. 3 is a perspective view of a cooling apparatus of the liquid crystal projector of the present embodiment.

To solve the problems, the liquid crystal projector P of the present invention includes the cooling apparatus 10 in the main body 1. That is, in the main body 1 of the liquid crystal projector P of the present invention, the cooling apparatus 10 is installed. This cooling apparatus 10 cools the liquid crystal panels 5, 6 and 7, the polarization plates 8A, 8B, the prism 25 and the like, and as shown in FIGS. 2 and 3, a compressor 12, a radiator 14, a capillary tube 16 (a pressure reducing unit of the present invention) and an evaporator 18 constitute a refrigerant circuit. That is, a refrigerant discharge tube 13 of the compressor 12 is connected to an inlet of the radiator 14, and an outlet of the radiator 14 is connected to a refrigerant pipe 15 extending to the capillary tube 16. Moreover, an outlet of the capillary tube 16 is connected to an inlet of the evaporator 18 through a refrigerant pipe 17, and an outlet of the evaporator 18 is connected to a refrigerant introducing tube 11 of the compressor 12, to constitute an annular refrigerant circuit. It is to be noted that in the present embodiment, the capillary tube 16 is used as the unit for reducing the pressure of the refrigerant, but the pressure reducing unit is not limited to the capillary tube as long as the pressure of the refrigerant can be reduced to a predetermined pressure, and any unit, for example, an expansion valve may be used.

Furthermore, the inside of the main body 1 of the liquid crystal projector P of the embodiment is partitioned into a first zone 31 and a sealed second zone 32 by a partition member 30. The partition member 30 is made of an insulating material. Here, usable examples of the insulating material include rubber plastic based materials such as hard vinyl chloride, a silicon resin, a fluorine resin, a phenol resin, a polycarbonate resin and a polystyrene resin having a thermal conductivity of about 0.1 W/(m·K) to 0.3 W/(m·K), vitreous materials such as quartz glass and a glass ceramic material having a thermal conductivity of about 1 W/(m·K) to 4 W/(m·K), fibrous insulating materials such as glass wool, rock wool and carbide cork having a thermal conductivity of 0.045 W/(m·K) or less, foam polystyrene, insulating materials for construction made of these materials and vacuum insulating materials made of the materials. In addition, a material having a thermal conductivity of 1 W/(m·K) or less may be used as the insulating material.

In the embodiment, the partition member 30 is attached to the substantial center of the main body 1 in a longitudinal direction (a lateral direction shown in FIG. 2) so as to extend from a wall face 1A on one side to a wall face 1B on the other side. The height dimension of the partition member 30 is substantially equal to that of the main body 1. Moreover, a recessed portion 34 is formed near the center of the partition member 30, and the box member 27 is disposed in this recessed portion 34. That is, the partition member 30 partitions the inside of the substantially whole main body 1 excluding a light path formed in the box member 27 into the first zone 31 and the second zone 32 in an insulating manner, to prevent heat movement in the space of the main body 1 (the first zone 31 and the second zone 32) outside the box member 27. Moreover, the partition member 30 is provided with two holes for pipe connection, and the refrigerant pipe 17 and the refrigerant introducing tube 11 of the cooling apparatus 10 extend through the holes and are connected to the holes, so that devices of the cooling apparatus 10 arranged in the first zone 31 are connected to devices of the cooling apparatus 10 arranged in the second zone 32.

Furthermore, the wall face 1A of the main body 1 on the one side of the first zone 31 is provided with air holes 35 which connect the inside of the first zone 31 to the outside. Moreover, the wall face 1B of the main body 1 on the other side of the first zone 31 is provided with air holes 37 which are formed in positions substantially facing the air holes 35 to connect the inside of the first zone 31 to the outside, and two fans 40, 40 are attached to the air holes 37. The fans 40, 40 suck the air from the first zone 31 to discharge the air to the outside.

Moreover, the light source 2, and the compressor 12, the radiator 14 and the capillary tube 16 of the cooling apparatus 10 are installed in the first zone 31. The compressor 12, the radiator 14 and the capillary tube 16 of the cooling apparatus 10 are installed near the air holes 35 in the first zone 31 of the main body 1. In the embodiment, the compressor 12 is arranged at a position which is closest to the air holes 35, the radiator 14 is arranged by the side of the compressor (on the side of the compressor 12 opposite to the air holes 35), and a fan 41 is provided by the side of the radiator 14 (on the side of the radiator 14 opposite to the compressor 12). The fan 41 sucks the outside air through the air holes 35, supplies the sucked air (the outside air) to the radiator 14, and discharges the air into the first zone 31.

Furthermore, when the fans 40, 40 and the fan 41 are operated, the outside air is sucked through the air holes 35 into the first zone 31 of the main body 1. The sucked outside air successively passes through the compressor 12 and the radiator 14, and is sucked by the fan 41. At this time, when the sucked outside air is supplied to the compressor 12, the compressor 12 heated by the operation can be cooled. Furthermore, when the outside air passed through the compressor 12 is allowed to flow into the radiator 14, the refrigerant flowing through the radiator 14 can be allowed to release heat.

In addition, the outside air sucked by the fan 41 is discharged into the first zone 31, and supplied to the light source 2 provided in the first zone 31. In consequence, the light source 2 releases the heat to the supplied air, and is cooled. At this time, since the light source 2 has a very high temperature as described above, even the air passed through the radiator 14 and heated by the refrigerant has a temperature remarkably lower than that of the light source 2, and hence the heat can sufficiently be released by the outside air passed through the radiator 14. The air (the outside air supplied through the air holes 35) heated at a high temperature by the light source 2 is then sucked by the fans 40, 40 and discharged from the main body 1.

It is to be noted that in the present embodiment, the compressor 12 is arranged at the position which is closest to the air holes 35 as described above, and the radiator 14 is arranged by the side of the compressor (on the side of the compressor 12 opposite to the air holes 35), but the present invention is not limited to this example. The radiator 14 may be arranged at a position which is closest to the air holes 35, and the compressor 12 may be arranged by the side of the radiator (on the side of the radiator 14 opposite to the air holes 35).

On the other hand, the liquid crystal panels 5, 6 and 7, the polarization plates 8A, 8B, the prism 25, the evaporator 18 of the cooling apparatus 10 and the like are installed in the second zone 32. The polarization plates 8A are provided on the incidence sides of the liquid crystal panels 5, 6 and 7, and the polarization plates 8B are provided on the emission sides of the liquid crystal panels 5, 6 and 7. Moreover, a fan 42 is installed in the vicinity of the evaporator 18, the fan 42 circulates, through the second zone 32, the air subjected to the heat exchange between the air and the refrigerant in the evaporator 18 (in this case, the air is the air in the second zone 32), and the air can be supplied to the liquid crystal panels 5, 6 and 7, the polarization plates 8A, 8B, the prism 25 and the like installed in the second zone 32.

A cooling operation using the cooling apparatus 10 of the present invention in the above constitution will be described. When the compressor 12 is driven, the refrigerant having a low temperature and a low pressure is sucked through the refrigerant introducing tube 11 into a compression element (not shown), and is compressed in the element. The compressed refrigerant having a high temperature and a high pressure is discharged into the refrigerant discharge tube 13, and flows into the radiator 14. The refrigerant flowing into the radiator 14 performs the heat exchange between the refrigerant and the outside air supplied through the air holes 35 in the radiator, to release the heat. The refrigerant releasing the heat in the radiator 14 enters the capillary tube 16 through the refrigerant pipe 15, the pressure of the refrigerant is reduced while the refrigerant passes through the capillary tube 16, and in this state, the refrigerant flows into the evaporator 18.

The refrigerant flowing into the evaporator 18 takes the heat from the air of the second zone 32 in the evaporator, to evaporate. On the other hand, after taking the heat from the air by the refrigerant in the evaporator 18, the cooled air (the cold air) is supplied to the liquid crystal panels 5, 6 and 7, the polarization plates 8A, 8B, the prism 25 and the like by the fan 42. In consequence, the liquid crystal panels 5, 6 and 7, the polarization plates 8A, 8B, the prism 25 and the like release the heat to such air, and are cooled. It is to be noted that the refrigerant receiving the heat of the second zone 32 (the liquid crystal panels 5, 6 and 7, the polarization plates 8A, 8B, the prism 25, etc.) by the evaporator 18 is sucked and compressed by the compressor 12 through the refrigerant introducing tube 11, flows into the radiator 14 and releases the heat to the blown outside air by the radiator 14. This cycle is repeated.

Thus, according to the liquid crystal projector P of the present invention, the cooling apparatus 10 is disposed in the main body 1, and the air subjected to the heat exchange between the air and the evaporator 18 of the cooling apparatus 10 can be supplied to the liquid crystal panels 5, 6 and 7, the polarization plates 8A, 8B, the prism 25 and the like provided in the second zone 32 by the fan 42 to cool the same. In consequence, the liquid crystal panels 5, 6 and 7, the polarization plates 8A, 8B, the prism 25 and the like can be cooled without being influenced by the outside air temperature, and the devices provided in the second zone 32, for example, the liquid crystal panels 5, 6 and 7, the polarization plates 8A, 8B, the prism 25 and the like can constantly be kept at an optimum constant temperature.

Moreover, since the cold air subjected to the heat exchange between the air and the evaporator 18 can constantly be supplied to the liquid crystal panels 5, 6 and 7, the polarization plates 8A, 8B and the prism 25, the amount of the heat to be released can remarkably be increased as compared with a conventional example where the outside air is supplied to the liquid crystal panels. Therefore, the fans can be miniaturized to reduce an installation space. Moreover, the amount of the air to be blown by the fans can be decreased to achieve the decrease of the noise. Furthermore, as compared with conventional thermoelectric cooling, an energy efficiency can remarkably be improved.

Furthermore, when the air heated by the heat generated by the liquid crystal panels 5, 6 and 7 and the refrigerant flowing through the evaporator 18 of the cooling apparatus 10 perform heat exchange therebetween, the heat of the liquid crystal panels 5, 6 and 7 can be conveyed by the refrigerant and discharged to the blown outside air by the radiator 14, so that unlike a case where the optical element is cooled by the thermoelectric cooling, a degree of freedom in spatial layout design (in the main body 1) increases.

Particularly in the present embodiment, the inside of the main body 1 is partitioned into the first zone 31 provided with the light source 2 and the second zone 32 provided with the liquid crystal panels 5, 6 and 7 by the partition member 30, and the air subjected to the heat exchange between the air and the evaporator 18 is circulated through the second zone 32, so that it is possible to securely eliminate a disadvantage that the liquid crystal panels 5, 6 and 7, the polarization plates 8A, 8B and the prism 25 are influenced by the heat from the light source 2. In consequence, a further cooling effect can be secured.

Moreover, when the air subjected to the heat exchange between the air and the evaporator 18 is circulated through the second zone 32 by the fan 42 to cool the liquid crystal panels 5, 6 and 7, the polarization plates 8A, 8B, the prism 25 and the like, the substantially sealed second zone 32 can homogeneously be cooled. That is, for example, in a case where evaporators are arranged close to the liquid crystal panels 5, 6 and 7, respectively, to directly cool the liquid crystal panels 5, 6 and 7, the temperature of the liquid crystal panels 5, 6 and 7 is lowest, a temperature in the second zone 32 becomes higher than that of the liquid crystal panels 5, 6 and 7, and the temperature in the second zone 32 becomes remarkably non-uniform. This causes a disadvantage that the cooled liquid crystal panels 5, 6 and 7 are heated by the air in the second zone 32, the polarization plates 8A, 8B, the prism 25 and the like, and it might be difficult to keep the temperature of the liquid crystal panels 5, 6 and 7 at an optimum constant temperature. Moreover, since the evaporators have to be attached to the liquid crystal panels 5, 6 and 7, cost soars, and a problem occurs that the degree of freedom in the space of the second zone 32 remarkably lowers.

However, according to the present invention, since the one evaporator 18 and the fan 42 are installed in the second zone 32 and the air cooled by the evaporator 18 can be circulated through the second zone 32 by the fan 42, the inside of the second zone 32 can substantially homogeneously be cooled, and the above problems can be solved.

Moreover, in the cooling apparatus 10, the heat of the liquid crystal panels 5, 6 and 7, the polarization plates 8A, 8B and the prism 25 is received by the refrigerant of the evaporator 18, conveyed to the radiator 14 by the refrigerant, released to the air in the radiator 14 and then discharged to the outside through the air holes 37, so that it is possible to securely eliminate a disadvantage that the heat generated by the liquid crystal panels 5, 6 and 7 is confined in the main body 1 and raises an internal temperature to cause a secondary damage on peripheral components.

Furthermore, any outside air is not introduced into the second zone 32 but the air in the second zone 32 is circulated through the zone. That is, the second zone 32 is a sealed space through which the air in the second zone 32 is circulated. Therefore, any dust or mote does not enter the zone from the outside air, and hence any filter is not necessary. In consequence, further cost decrease can be achieved.

It is to be noted that in the present embodiment, the partition member 30 is constituted of one plate member attached to extend from the wall face 1A at one end to the wall face 1B at the other end, but the present invention is not limited to this example, and the partition member may be constituted of a plurality of plate members, for example, two plate members. One of the plate members may detachably be arranged between the box member 27 and the wall face 1A, and the other plate member may detachably be arranged between the box member 27 and the wall face 1B. Thus, when the partition member 30 is constituted of a plurality of plate members, and detachably attached to the main body 1, an assembling operation during production can smoothly be performed. Moreover, even during repair or the like, a removal operation can easily be performed, or the assembling operation after the repair can easily be performed.

For example, when the partition member 30 attached to the inside of the main body 1 is removed from the main body 1 during the repair, a portion to be repaired in the main body 1 can easily be repaired, or a breakdown portion can easily be removed, and a repair operation can easily be performed. Moreover, after the end of the repair, the partition member 30 can easily be attached to the main body 1. Consequently, the improvement of repair operability can be achieved.

Embodiment 2

Figure 4:
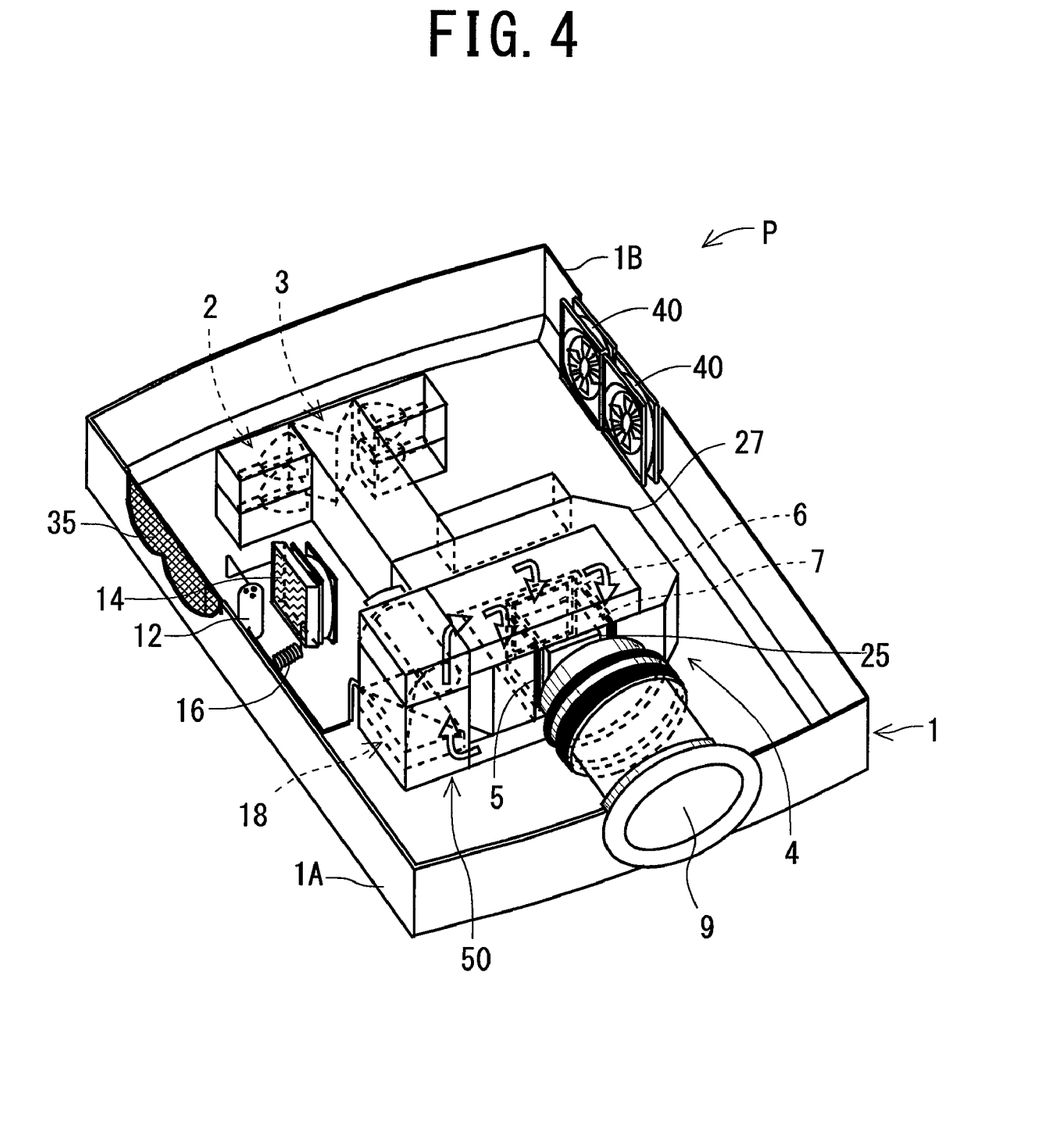
FIG. 4 is a perspective view showing the outline of a liquid crystal projector of another embodiment of the present invention.
Figure 5:
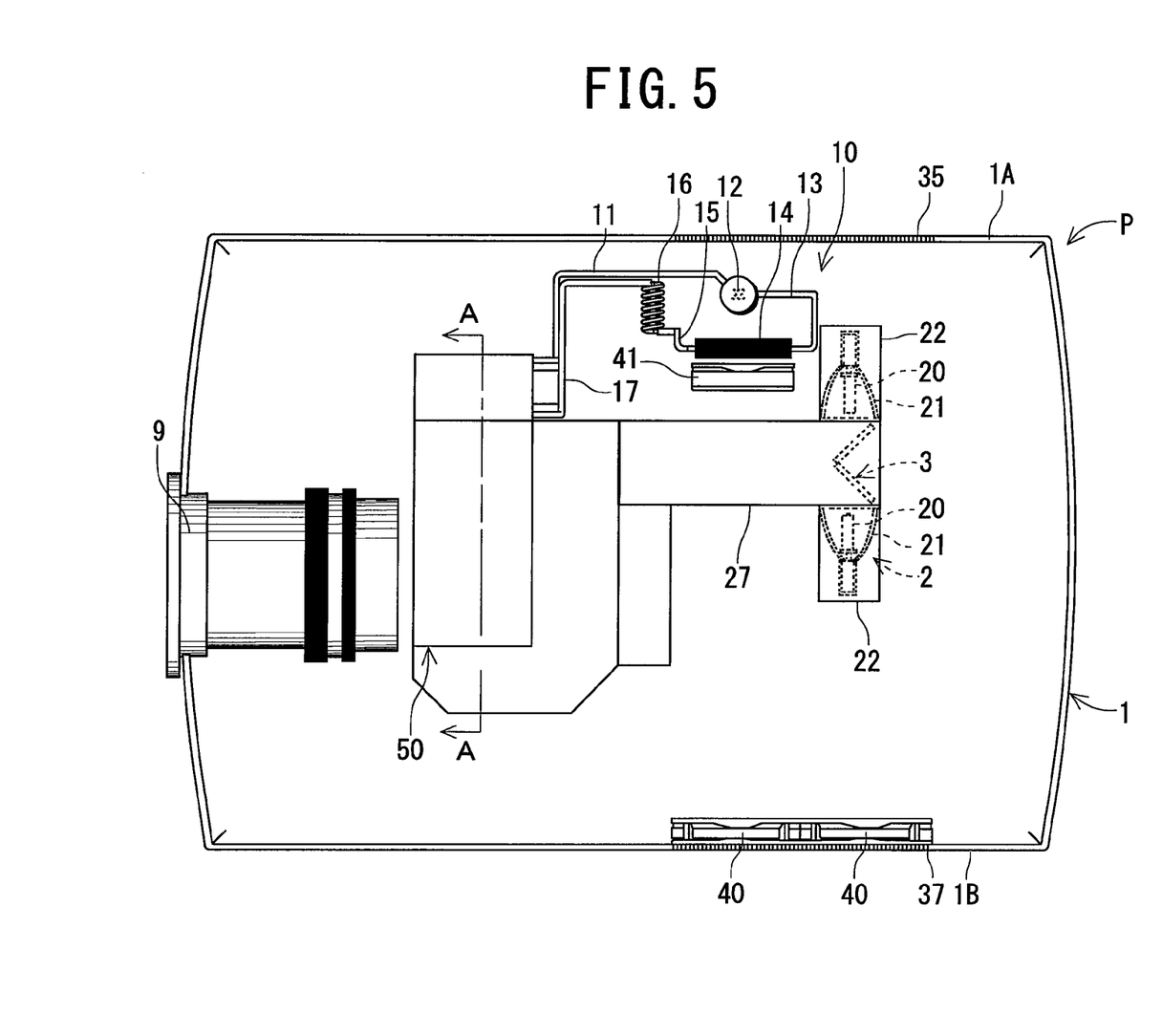
FIG. 5 is a plan view showing the outline of the liquid crystal projector of the other embodiment of the present invention.
Figure 6:
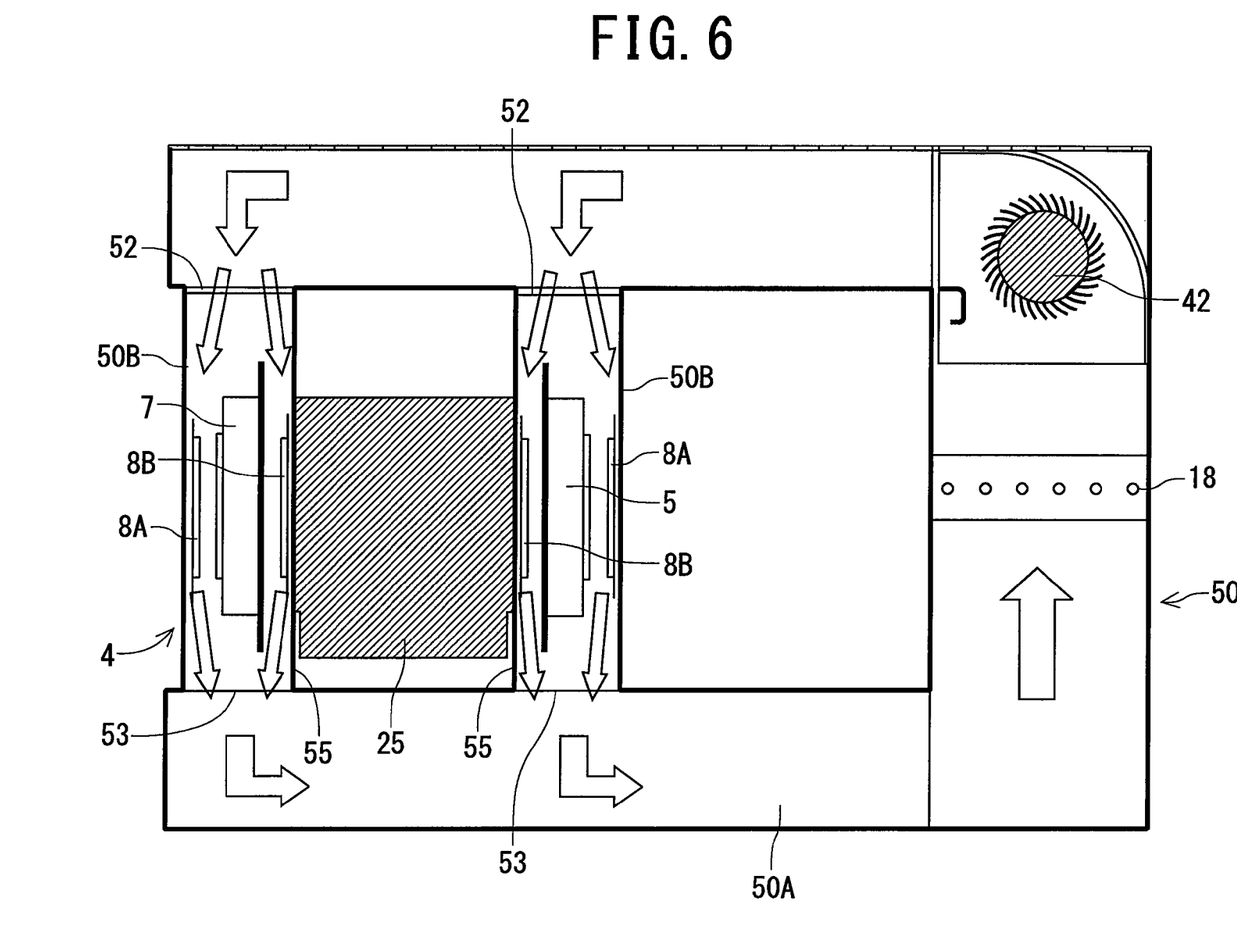
FIG. 6 is a sectional view cut along the A-A line of FIG. 4.

Next, another embodiment of the present invention will be described with reference to FIGS. 4 to 6. FIG. 4 shows a perspective view of the outline of a liquid crystal projector of the present embodiment, FIG. 5 shows a plan view of FIG. 4, and FIG. 6 shows a sectional view cut along the A-A line of FIG. 5, respectively. It is to be noted that in FIGS. 4 to 6, parts denoted with the same reference numerals as those of FIGS. 1 to 3 produce the same or similar effect or function, and the description thereof is omitted here.

In a liquid crystal projector P of the present embodiment, unlike the liquid crystal projector P of Embodiment 1 described above, the inside of a main body 1 is not partitioned by a partition member 30. In this case, a duct 50 is provided around liquid crystal panels 5, 6 and 7, polarization plates 8A, 8B and a prism 25, and cold air subjected to heat exchange between the air and an evaporator 18 is supplied to the liquid crystal panels 5, 6 and 7, the polarization plates 8A, 8B and the prism 25 through the duct 50. That is, in the liquid crystal projector P of the present embodiment, unlike the above embodiment, the liquid crystal panels 5, 6 and 7 are not provided in a substantially sealed space, but the liquid crystal panels 5, 6 and 7, the polarization plates 8A, 8B and the prism 25 are arranged in a cooling air path constituted of the duct 50, and locally cooled by the cold air circulated through the duct 50.

The duct 50 of the present embodiment is made of an insulating material. Usable examples of the insulating material include rubber plastic based materials such as hard vinyl chloride, a silicon resin, a fluorine resin, a phenol resin, a polycarbonate resin and a polystyrene resin having a thermal conductivity of about 0.1 W/(m·K) to 0.3 W/(m·K), vitreous materials such as quartz glass and a glass ceramic material having a thermal conductivity of about 1 W/(m·K) to 4 W/(m·K), fibrous insulating materials such as glass wool, rock wool and carbide cork having a thermal conductivity of 0.045 W/(m·K) or less, foam polystyrene, insulating materials for construction made of these materials and vacuum insulating materials made of the materials. In addition, a material having a thermal conductivity of 1 W/(m·K) or less may be used as the insulating material.

Moreover, in the present embodiment, the evaporator 18 constitutes a part of the duct 50, and cold air subjected to heat exchange between the air and this evaporator 16 can be circulated. The duct 50 is formed around the liquid crystal panels 5, 6 and 7 and the prism 25, and constituted of a cylindrical sealed path 50A substantially having a U-shape, and communication tubes 50B which connect blow-off ports 52 formed in one end of the sealed path 50A positioned above the liquid crystal panels 5, 6 and 7 to suction ports 53 formed in the other end of the sealed path 50A positioned under the liquid crystal panels 5, 6 and 7. In the sealed path 50A, the evaporator 18 and a fan 42 are installed.

Moreover, in the communication tubes 50B, the liquid crystal panels 5, 6 and 7 are installed (one of the three liquid crystal panels 5, 6 and 7 is installed in one communication tube 50B) and the polarization plates 8A, 8B are installed, respectively. The liquid crystal panels 5, 6 and 7 and the polarization plates 8A, 8B are arranged in the communication tube 50B with spaces being left between the panels and the plates. Moreover, the polarization plate 8A is arranged with a space being left between the plate and one wall face of the communication tube 50B, and the polarization plate 8B is similarly arranged with a space being left between the plate and the other wall face of the communication tube 50B. Furthermore, this communication tube 50B is arranged so that the tube does not disturb light to irradiate the liquid crystal panels 5, 6 and 7 and the polarization plates 8A, 8B, and image information modulated by the liquid crystal panels 5, 6 and 7 and then sent to the prism 25, and the cold air subjected to the heat exchange between the air and the evaporator 16 is supplied to the liquid crystal panels 5, 6 and 7, the polarization plates 8A, 8B and the prism 25.

That is, a hole (not shown) is formed in a position corresponding to the polarization plate 8A (i.e., the one wall face of the communication tube 50B corresponding to the polarization plate 8A) on a polarization plate 8A side of the communication tube 50B, and this hole is connected to an opening of a box member 27 in which a light path is formed (not shown in FIG. 6). Moreover, a hole 55 is formed in a position corresponding to the polarization plate 8B (i.e., the other wall face of the communication tube 50B corresponding to the polarization plate 8B) on a polarization plate 8B side of the communication tube 50B. This hole 55 has substantially the same shape as the outer shape of the prism 25, one face of the prism 25 abuts on the inner surface of the hole 55, or the one face is fitted into the hole 55 to close this hole. Furthermore, the prism 25 is attached to the hole 55 with a space being left between the prism and each polarization plate 8B.

When the duct 50 is formed as described above, the duct does not disturb the light to irradiate the liquid crystal panels 5, 6 and 7 and the polarization plates 8A, 8B, and the image information modulated by the liquid crystal panels 5, 6 and 7 and then sent to the prism 25, but the inside of the duct 50 has a sealed structure or a semi-sealed structure, and the air subjected to the heat exchange between the air and the evaporator 16, cooled and circulated through the duct 50 can be supplied to the liquid crystal panels 5, 6 and 7, the polarization plates 8A, 8B and the prism 25.

A cooling operation of the liquid crystal panels 5, 6 and 7 of the present embodiment having the above constitution will be described. It is to be noted that in the present embodiment, an only operation different from that of the above embodiment will briefly be described. It is to be noted that an operation of a cooling apparatus 10 is similar to that of the above embodiment and hence the description thereof is omitted.

The air cooled by taking the heat from the air by the refrigerant in the evaporator 18 is discharged into the communication tube 50B through the respective blow-off ports 52 . . . formed right above the liquid crystal panels 5, 6 and 7 and the polarization plates 8A, 8B by the fan 42 installed in the sealed path 50A of the duct 50, and the air is supplied to the liquid crystal panels 5, 6 and 7, the polarization plates 8A, 8B and the prism 25. That is, the air flowing through the blow-off ports 52 into the communication tube 50B passes through gaps formed between the liquid crystal panels 5, 6 and 7 and the polarization plates 8A provided in this communication tube 50B, between the liquid crystal panels 5, 6 and 7 and the polarization plates 8B, between the polarization plate 8A and the one wall face of the communication tube 50B (i.e., the hole connected to the opening of the box member 27) and between the polarization plate 8B and the other wall face of the communication tube 50B (i.e., the prism 25). In consequence, the liquid crystal panels 5, 6 and 7, the polarization plates 8A, 8B and the prism 25 release the heat to the air (the cold air), and are cooled.

Then, the air receiving the heat and heated by the liquid crystal panels 5, 6 and 7, the polarization plates 8A, 8B and the prism 25 is sucked into the sealed path 50A through the suction ports 53 formed right under the liquid crystal panels 5, 6 and 7 and the polarization plates 8A, 8B, respectively, to reach the evaporator 18. In the evaporator, the air performs heat exchange between the air and the refrigerant flowing through the evaporator 18, is cooled, and is again supplied to the liquid crystal panels 5, 6 and 7, the polarization plates 8A, 8B and the prism 25 through the blow-off ports 52 by the fan 42. This cycle is repeated.

Even when the duct 50 for supplying the cold air subjected to the heat exchange between the air and the evaporator 18 to the liquid crystal panels 5, 6 and 7, the polarization plates 8A, 8B and the prism 25 is formed around the liquid crystal panels 5, 6 and 7, the polarization plates 8A, 8B and the prism 25, the liquid crystal panels 5, 6 and 7, the polarization plates 8A, 8B, the prism 25 and the like can be cooled without being influenced by the outside air temperature in the same manner as in the above embodiment. Similarly, the cold air subjected to the heat exchange between the air and the evaporator 18 can constantly be supplied to the liquid crystal panels 5, 6 and 7, the polarization plates 8A, 8B and the prism 25, and hence the amount of the heat to be released is remarkably increased as compared with a conventional example where the outside air is supplied to the liquid crystal panels. Therefore, the fan can be miniaturized to achieve the reduction of an installation space. Moreover, the amount of the air to be blown by the fan can be decreased to achieve the decrease of noise. Furthermore, as compared with the conventional thermoelectric cooling, an energy efficiency can remarkably be improved.

Moreover, as in the present embodiment, the duct 50 is provided with a sealed structure, or a semi-sealed structure, the cold air subjected to the heat exchange between the air and the evaporator 16 is supplied to the liquid crystal panels 5, 6 and 7, the polarization plates 8A, 8B and the prism 25, and the cold air subjected to the heat exchange between the air and the evaporator 16 can be circulated. In this constitution, the cold air subjected to the heat exchange between the air and the evaporator 16 is more effectively supplied to the liquid crystal panels 5, 6 and 7, the polarization plates 8A, 8B and the prism 25, and the heat release effect of the liquid crystal panels 5, 6 and 7, the polarization plates 8A, 8B and the prism 25 can further be promoted.

Furthermore, even in the present embodiment, in the cooling apparatus 10, the heat of the liquid crystal panels 5, 6 and 7, the polarization plates 8A, 8B and the prism 25 is received by the refrigerant of the evaporator 18, conveyed to a radiator 14 by the refrigerant, released to the air in the radiator 14 and then discharged to the outside through air holes 37, so that it is possible to securely eliminate a disadvantage that the heat generated by the liquid crystal panels 5, 6 and 7 is confined in the main body 1 and raises an internal temperature to cause a secondary damage on peripheral components.

As described above in detail, according to the present invention, while decreasing the generation of the noise as much as possible, the liquid crystal panels 5, 6 and 7, the polarization plates 8A, 8B and the prism 25 can efficiently be cooled, and the liquid crystal projector having a high performance can be provided at a low cost.

It is to be noted that although not especially described in the above embodiment, the amounts of the heat to be generated by rays of colors R, G and B to irradiate the liquid crystal panels 5, 6 and 7, respectively, are large in order of B, G and R. Therefore, the arrangement of the fan 42 and the shape of the duct 50 are taken into consideration so that the amounts of the cold air to be supplied to the liquid crystal panels 5, 6 and 7 are large in this order. For example, the diameters of the blow-off port 52 and the suction port 53 provided above and under the liquid crystal panel irradiated with the ray of the color B having the largest amount of the heat to be generated are set to the largest diameter, the diameters of the blow-off port 52 and the suction port 53 provided above and under the liquid crystal panel irradiated with the ray of G are set to a smaller diameter, and the diameters of the blow-off port 52 and the suction port 53 provided above and under the liquid crystal panel irradiated with the ray of R having the smallest amount of the heat to be generated are set to the smallest diameter. Thus, the amount of the air to be blown may be adjusted.

Moreover, the duct 50 of the present embodiment is constituted of the sealed path 50A and the communication tubes 50B, but this sealed path 50A and the communication tubes 50B may detachably be attached to the main body 1. Furthermore, the duct 50 may further be constituted of a plurality of members detachably provided in the main body 1. Thus, when the duct 50 is constituted of the plurality of members detachably provided in the main body 1, an assembling operation during production can smoothly be performed. Furthermore, even during repair or the like, a removal operation can easily be performed, or the assembling operation after the repair can easily be performed.

For example, when the duct 50 attached to the inside of the main body 1 is removed from the main body 1 during the repair, a portion to be repaired in the main body 1 can easily be repaired, or a breakdown portion can easily be removed, and a repair operation can easily be performed. Moreover, after the end of the repair, the duct 50 can easily be attached to the main body 1. In particular, the evaporator 18, the fan 42, the liquid crystal panels 5, 6 and 7, the polarization plates 8A, 8B and the prism 25 provided in the duct 50 can easily be removed or assembled, and repair operability can remarkably be improved.

It is to be noted that in the present embodiment, the evaporator 16 constitutes a part of the duct 50, but the present invention is not limited to this embodiment, and the evaporator 16 may be provided in the duct 50 so that the cold air subjected to the heat exchange between the air and the evaporator 16 can be circulated.

In the above embodiments, the compressor 12 and the radiator 14 are provided in the main body 1, but the present invention is not limited to these embodiments, and they may be arranged on the bottom surface of the main body 1. In this case, when the main body 1 is made of a material excellent in heat release properties (in the embodiments, magnesium is used as the material) as described above, the compressor 12 and the radiator 14 are allowed to release the heat, and it is possible to prevent a disadvantage that the heat of the compressor 12 and the radiator 14 is transmitted to the inside of the main body 1.

Furthermore, in the embodiments, the liquid crystal projector has been described as one example of the projector, but the projector of the present invention is not limited to this liquid crystal projector, and may be any projector including a main body provided with a light source, an optical element which processes light emitted from this light source in accordance with image information and a projection lens which projects a processed projection optical image onto a screen. Even when the present invention is applied to, for example, a DLP projector (DLP (registered trademark)), the present invention is effective.

What is claimed is:

1. A projector comprising:
   a main body provided with a light source, an optical element which processes light emitted from the light source in accordance with image information and a projection lens which projects a processed projection optical image onto a screen; and
   a cooling apparatus, disposed in the main body, for cooling the optical element, the cooling apparatus comprising a compressor, a radiator, a pressure reducing unit and an evaporator, which constitute a refrigerant circuit, wherein:
   air which has been heat-exchanged at the evaporator is supplied to the optical element for cooling the optical element,
   an inside of the main body is partitioned, by a partition member, into a first zone in which the light source is disposed and a second zone in which the optical element and the evaporator are disposed and which is sealed,
   the air which has been heat-exchanged at the evaporator is circulated through the second zone,
   the partition member is made of a heat insulating material, and
   the partition member is constituted of a plurality of plate members, and detachably provided in the main body.

2. The projector according to claim 1, wherein:
   the main body includes a air hole in the first zone, and
   the radiator is disposed in the first zone.

3. A projector comprising:

a main body provided with a light source, an optical element which processes light emitted from the light source in accordance with image information and a projection lens which projects a processed projection optical image onto a screen; and a cooling apparatus for cooling the optical element, the cooling apparatus comprising a compressor, a radiator, a pressure reducing unit and an evaporator, which constitute a refrigerant circuit, wherein:

air which has been heat-exchanged at the evaporator is supplied to the optical element for cooling the optical element, the air which is supplied to the optical element through a duct, the evaporator constitutes a part of the duct or is provided in the duct, and the duct is made of a heat insulating material, and constituted so that the air which has been heat-exchanged at the evaporator is circulated through the duct.

4. The projector according to claim 3, wherein the duct is constituted of a plurality of members detachably provided in the main body.

5. A projector comprising:

a main body provided with a light source, an optical element which processes light emitted from the light source in accordance with image information and a projection lens which projects a processed projection optical image onto a screen; and a cooling apparatus for cooling the optical element, the cooling apparatus comprising a compressor, a radiator, a pressure reducing unit and an evaporator, which constitute a refrigerant circuit, wherein:

air which has been heat exchanged at the evaporator is supplied to the optical element for cooling the optical element, the air which is heat-exchanged at the evaporator is supplied to the optical element through a duct, and the duct is constituted of a plurality of members detachably provided in the main body.

6. The projector according claim 1, 3, 4 or 5, wherein the optical element includes a liquid crystal panel, polarization plates provided on an incidence side and an emission side of the liquid crystal panel, respectively, and a prism.

* * * * *